US008474882B2

(12) United States Patent
Chang et al.

(10) Patent No.: US 8,474,882 B2
(45) Date of Patent: Jul. 2, 2013

(54) SLIDING MECHANISM FOR PORTABLE ELECTRONIC DEVICE

(75) Inventors: Chia-Hsin Chang, Tu-Cheng (TW); Long Chin, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 596 days.

(21) Appl. No.: 12/769,841

(22) Filed: Apr. 29, 2010

(65) Prior Publication Data
US 2010/0320200 A1 Dec. 23, 2010

(30) Foreign Application Priority Data
Jun. 18, 2009 (CN) .......................... 2009 1 0303422

(51) Int. Cl.
*E05C 19/06* (2006.01)
(52) U.S. Cl.
USPC ........ 292/80; 292/DIG. 61; 292/81; 292/303; 292/121
(58) Field of Classification Search
USPC ............... 292/80, 81, 84, 209, 303, 125, 114, 292/121, 171, 141, 152, 225, DIG. 11, DIG. 16, 292/DIG. 61; 455/575.4, 575.1
See application file for complete search history.

(56) References Cited

U.S. PATENT DOCUMENTS

| 5,956,625 | A  | * | 9/1999 | Hansen et al. ............. | 455/575.4 |
| 6,073,027 | A  | * | 6/2000 | Norman et al. ............. | 455/575.4 |
| 7,343,182 | B2 | * | 3/2008 | Wu ............................. | 455/575.4 |
| 7,376,449 | B2 | * | 5/2008 | Mizuta et al. ............. | 455/575.3 |
| 7,980,876 | B2 | * | 7/2011 | Bombale et al. ............. | 439/301 |
| 8,010,170 | B2 | * | 8/2011 | Shi et al. .................... | 455/575.1 |
| 2010/0035670 | A1 | * | 2/2010 | Mine .......................... | 455/575.4 |

FOREIGN PATENT DOCUMENTS

| CN | 201039236 Y | | 3/2008 |
| CN | 201222757 Y | | 4/2009 |
| EP | 1037444 A2 | * | 9/2000 |

* cited by examiner

*Primary Examiner* — Carlos Lugo
*Assistant Examiner* — Mark Williams
(74) *Attorney, Agent, or Firm* — Altis Law Group, Inc.

(57) ABSTRACT

A sliding mechanism for portable electronic device includes a sliding housing, a main housing and a stopping module. The sliding housing includes two ledges. At least one of the ledges defines a first notch and a second notch. The main housing includes two rails and at least one elastic member. The sliding housing is slidingly attached to the main housing by engagement of the ledges and the rails. The at least one elastic member includes a positioning portion. The positioning portion flexibly resists the at least one of the ledges and is selectively engaged in the first notch and the second notch. The stopping module prevents the sliding housing from separating from the main housing.

17 Claims, 13 Drawing Sheets

SLIDING MECHANISM FOR PORTABLE ELECTRONIC DEVICE

BACKGROUND

1. Technical Field

The present disclosure relates to sliding mechanisms for slidably connecting two members, particularly to a sliding mechanism configured (i.e., structured and arranged) for use in a slide-type portable electronic device to slidably interconnect two casings of a device.

2. Description of Related Art

Slide-type portable electronic devices usually include a main housing, a sliding housing, and a sliding mechanism. The sliding mechanism drives the sliding housing to slide with respect to the main housing. A conventional sliding mechanism includes a body section, a cover section, and a torsion spring. One end of the torsion spring is fixed to the body section, and the other end of the torsion spring is fixed to the cover section. The cover section slides relative to the body section by releasing the torsion force of the torsion spring. Due to the main housing and the slidable housing being fixed to the body section and the cover section, the slidable housing can slide relative to the main housing.

However, after repeated use, the torsion spring may wear out and fail to function properly, thereby degrading the sliding mechanism.

Therefore, there is chamber for improvement within the art.

BRIEF DESCRIPTION OF THE DRAWINGS

Many aspects of the sliding mechanism can be better understood with reference to the following drawings. The components in the drawings are not necessarily drawn to scale, the emphasis instead being placed upon clearly illustrating the principles of the sliding mechanism, in which.

DETAILED DESCRIPTION

Figure 1:
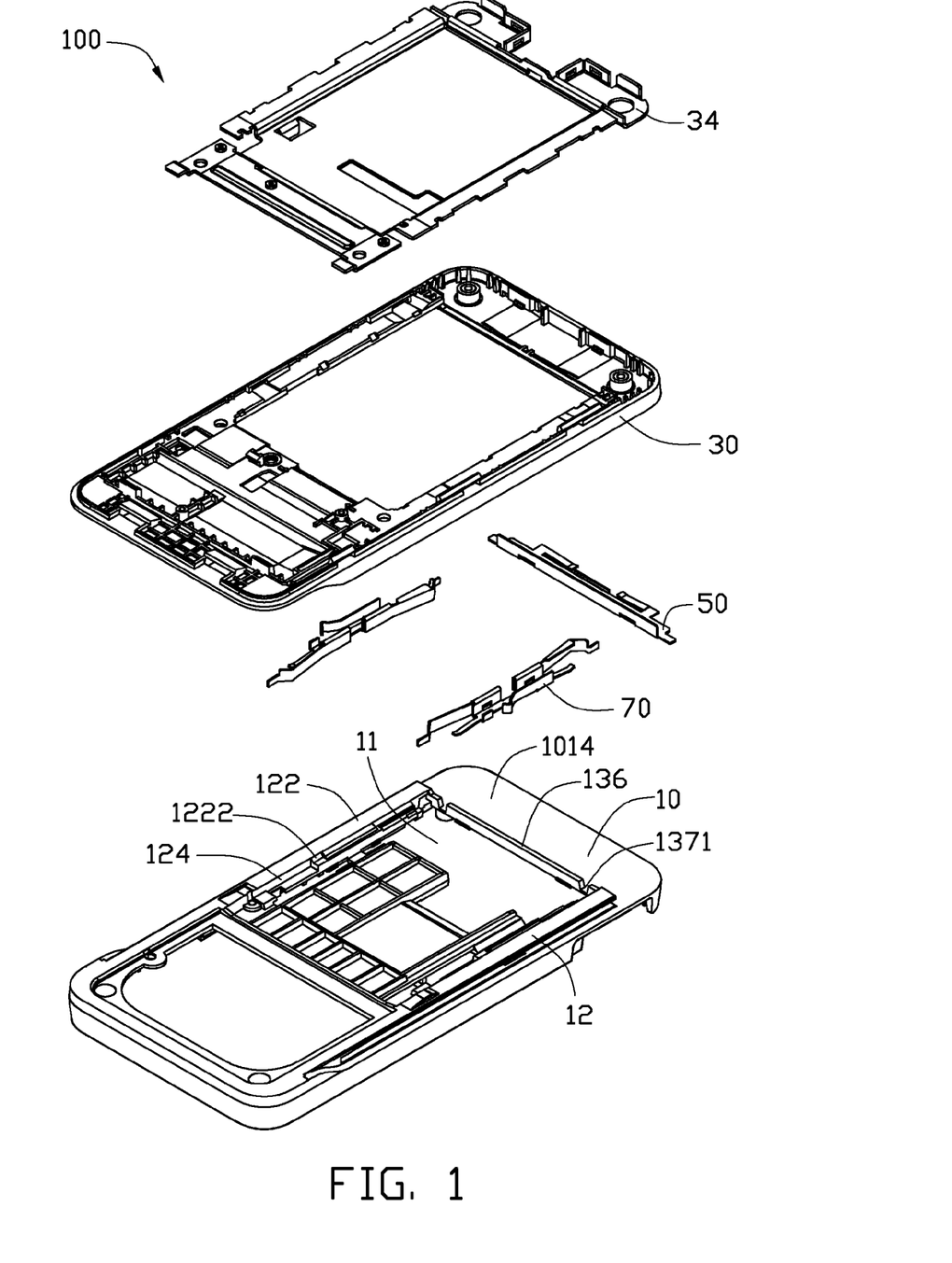
FIG. 1 is an exploded, isometric view of a sliding mechanism for portable electronic device, in accordance with an exemplary embodiment.

FIG. 1 shows an exemplary embodiment of a sliding mechanism 100 for a portable electronic device (not labeled). The sliding mechanism 100 includes a main housing 10, a sliding housing 30, a stopping member 50, and two elastic members 70.

Figure 2:
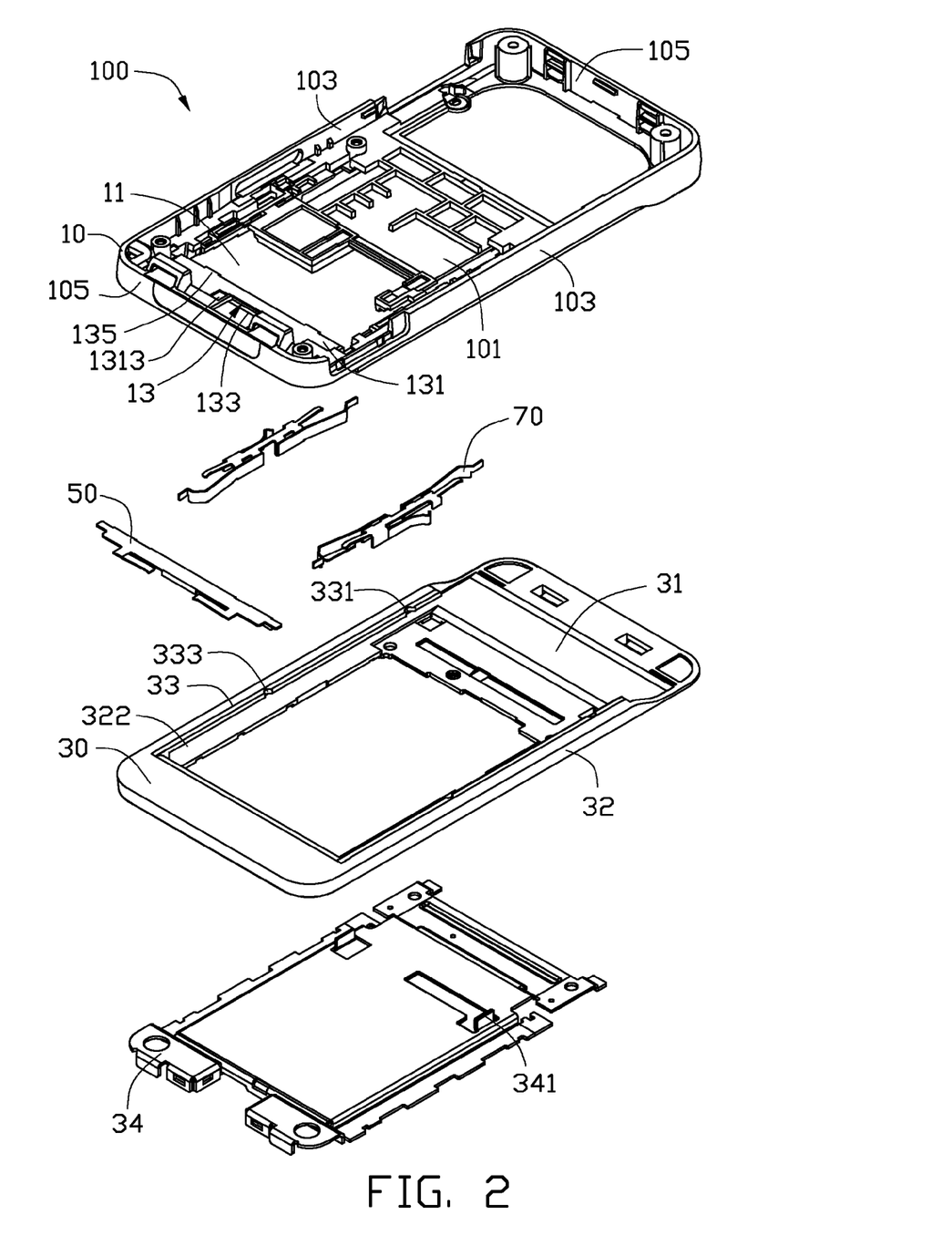
FIG. 2 is similar to FIG. 1, but shown from another aspect.
Figure 3:
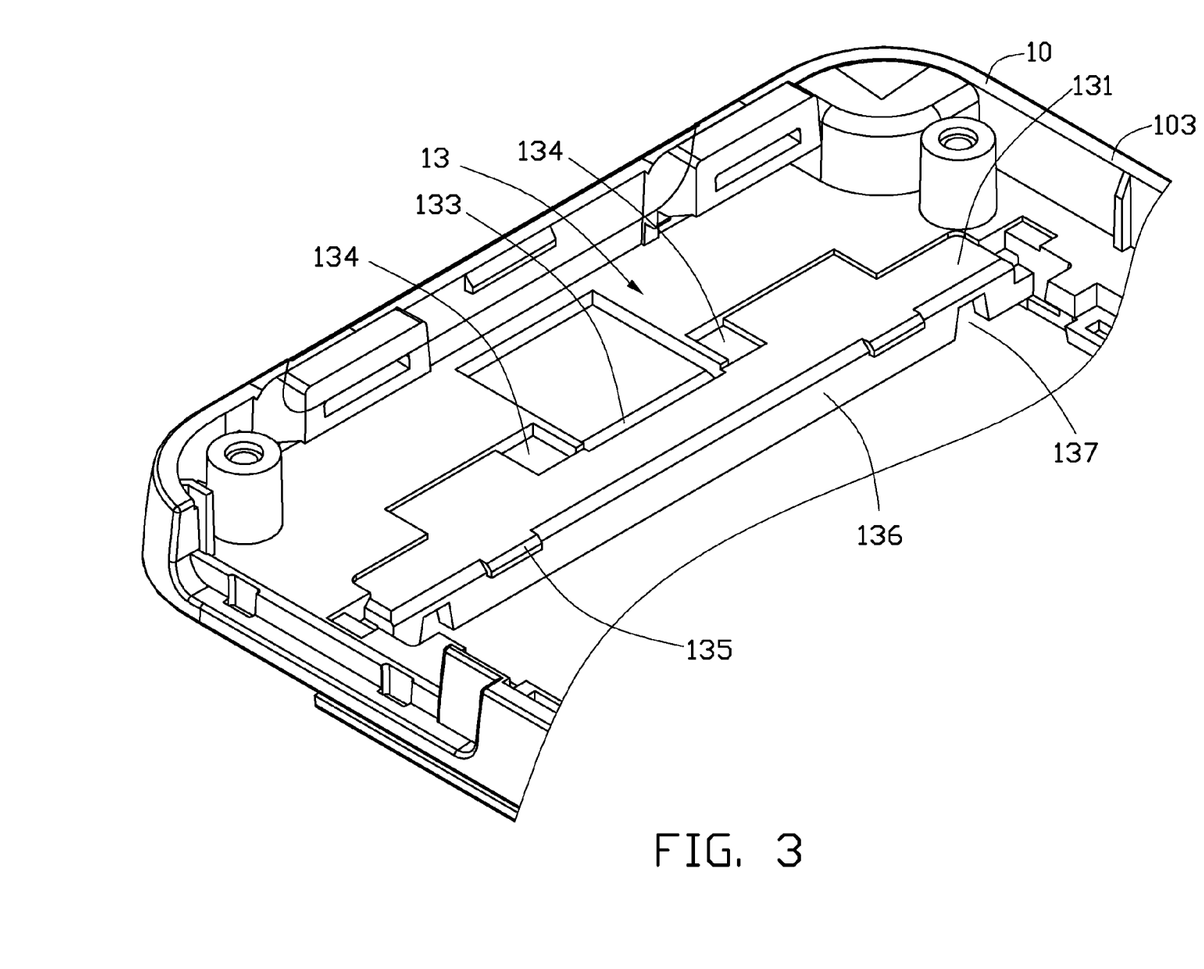
FIG. 3 is a partially, enlarged view of a main housing of the sliding mechanism shown in FIG. 1.
Figure 4:
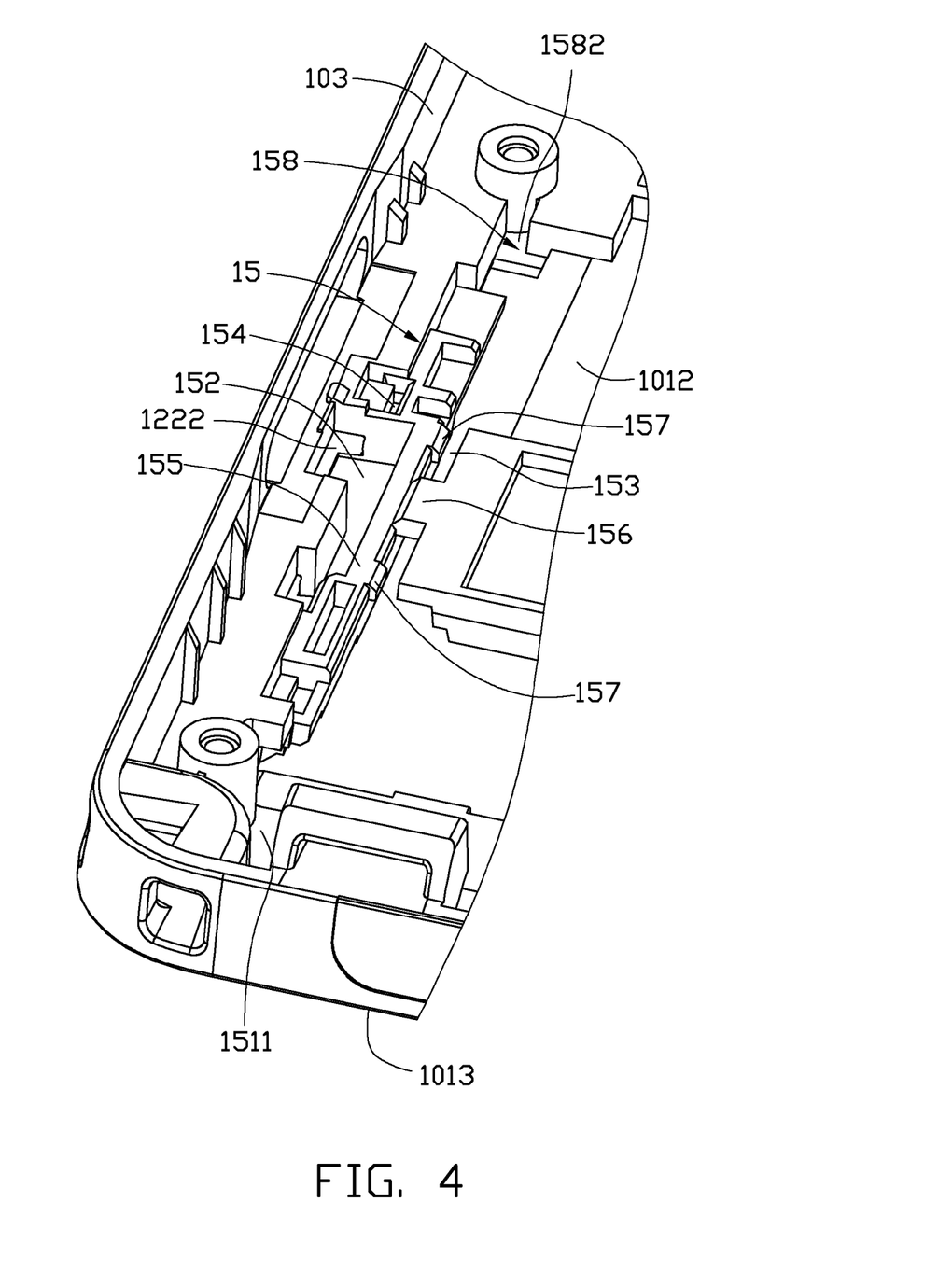
FIG. 4 is a partially, enlarged view of the main body shown in FIG. 1 from another angle.

Also referring to FIGS. 2-4, the main housing 10 includes a main board 101, two opposite sidewalls 103 and two opposite end walls 105. The sidewalls 103 and the end walls 105 surround the main board 101. The main board 101 includes a first surface 1012 and an opposite second surface 1014. The main board 101 defines a through hole 11 near one of the end wall 105 communicating with the first, second surfaces 1012, 1014.

Two parallel rails 12 protrude from the second surface 1014 of the main board 101. The rails 12 are L-shaped and a top surface of each is a guiding plate 122 and the other part of the L-shape is an internally facing side surface as a supporting plate 124. The rails 12 are configured as mirror images of each other. Each supporting plate 124 defines a receiving hole 1222.

A latching portion 13 is formed at the main housing 10 adjacent to one of the end walls 105. The latching portion 13 includes a horizontal surface 131 connected to a vertical wall 136. A slot 133 and two grooves 134 are defined in the horizontal surface 131. The grooves 134 are positioned at two opposite sides of the slot 133. Two blocks 135 protrude from an intersection of the vertical wall 136 and the horizontal surface 131. Two cutouts 137 are defined at two sides of the blocks 135 and are spaced from the horizontal surface 131.

Two locking portions 15 are respectively formed adjacent to one of the sidewalls 103. Each locking portion 15 defines a first gap 152, a second gap 153 and a third gap 154. The first gap 152 communicates with the receiving hole 1222 of the corresponding rail 12. A bar 155 is formed between the first gap 152 and the second gap 153. The second gap 153 communicates with the through hole 11. A bridge portion 156 extends from the bar 155, dividing the second gap 153 into two parts. Two protrusions 157 protrude from the bar 155, positioned at two sides of the bridge 156. The third gap 154 is positioned at a same side of the first gap 152 as the bar 155. Each locking portion 15 defines two receiving chambers 158 at two ends, respectively. The receiving chambers 158 communicate with the second gaps 153, and each includes a bottom 1582 for supporting one end of the elastic member 70.

The sliding housing 30 includes a base board 31 and two opposite sidewalls 32 extending from the base board 31. Two ledges 33 vertically protrude from the sidewalls 32 toward each other. A space 332 between the base board 31 and the ledges 33 allows the guiding plates 122 of the main housing 10 to slide. Each ledge 33 defines a first notch 331 and a second notch 333.

A metal board 34 is attached to the sliding housing 30 for electrically connecting the sliding housing 30 to the main housing 10. Two spaced wings 341 are formed adjacent to one end of the metal board 34, corresponding to the cutouts 137 of the latching portion 13.

Figure 5:
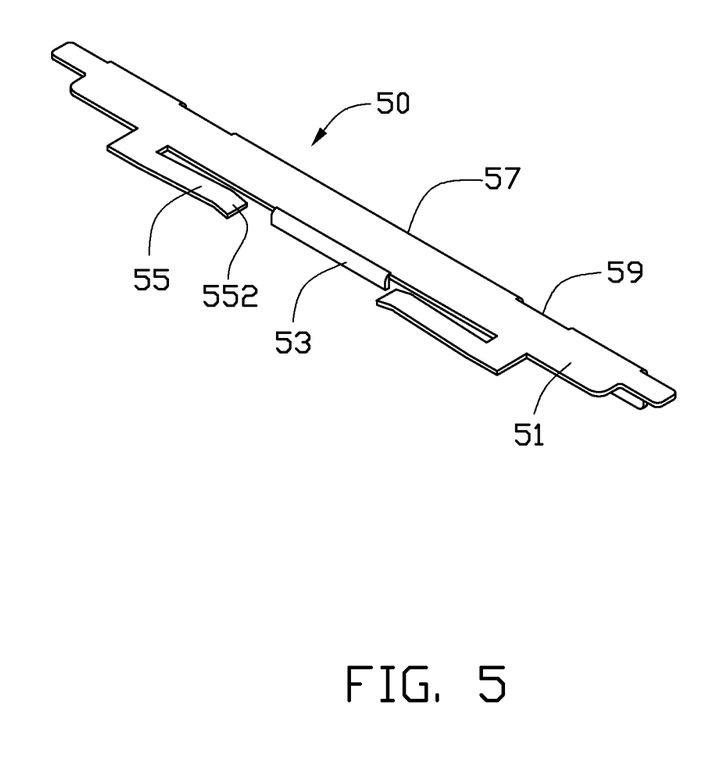
FIG. 5 is an isometric view of a stopping member of the sliding mechanism shown in FIG. 1.
Figure 6:
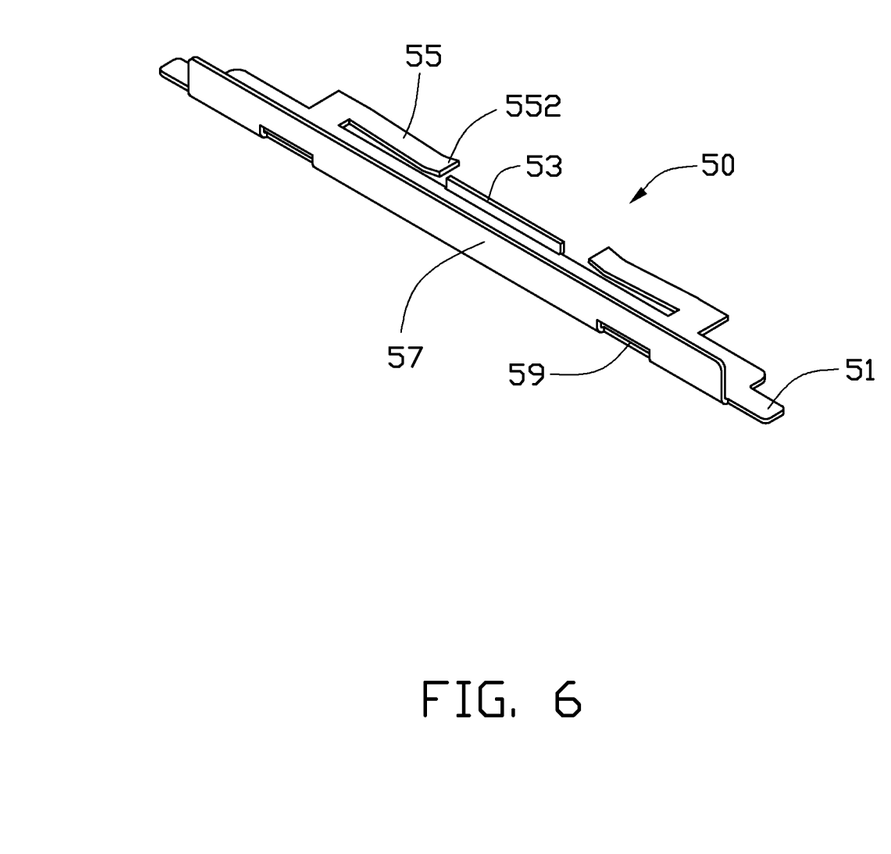
FIG. 6 is similar to FIG. 5, but shown another aspect.

Referring to FIGS. 5-6, the stopping member 50 includes a main plate 51, a locking plate 53, two engaging arms 55 and a bent plate 57. The locking plate 53 is receivable in the slot 133 of the main housing 10. The engaging arms 55 are L-shaped and connected at one end to the member 50 and in this embodiment distal ends extend toward each other in parallel with the member 50. Each engaging arm 55 includes a curved end 552. The bent plate 57 defines two latching holes 59 allowing the blocks 135 to extend through correspondingly.

Figure 7:
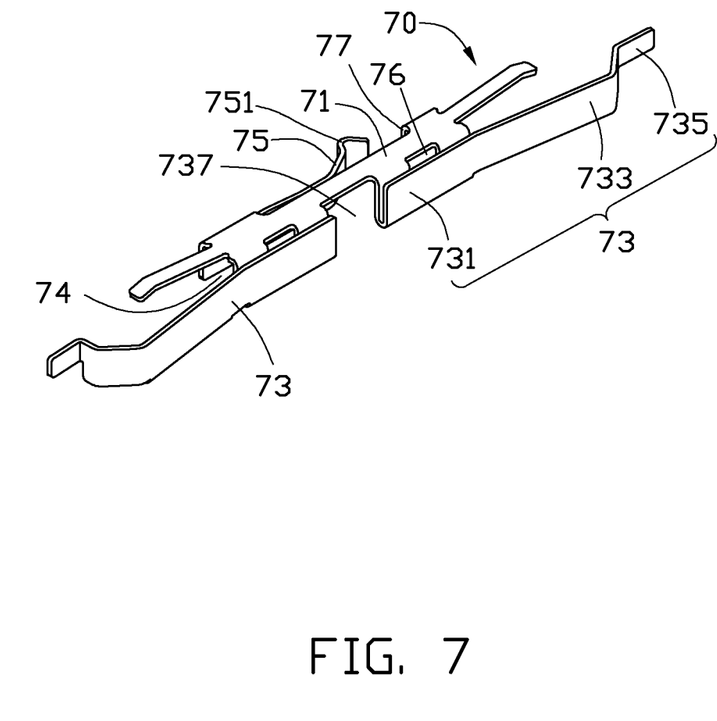
FIG. 7 is an enlarged view of an elastic member of the sliding mechanism shown in FIG. 1.
Figure 8:
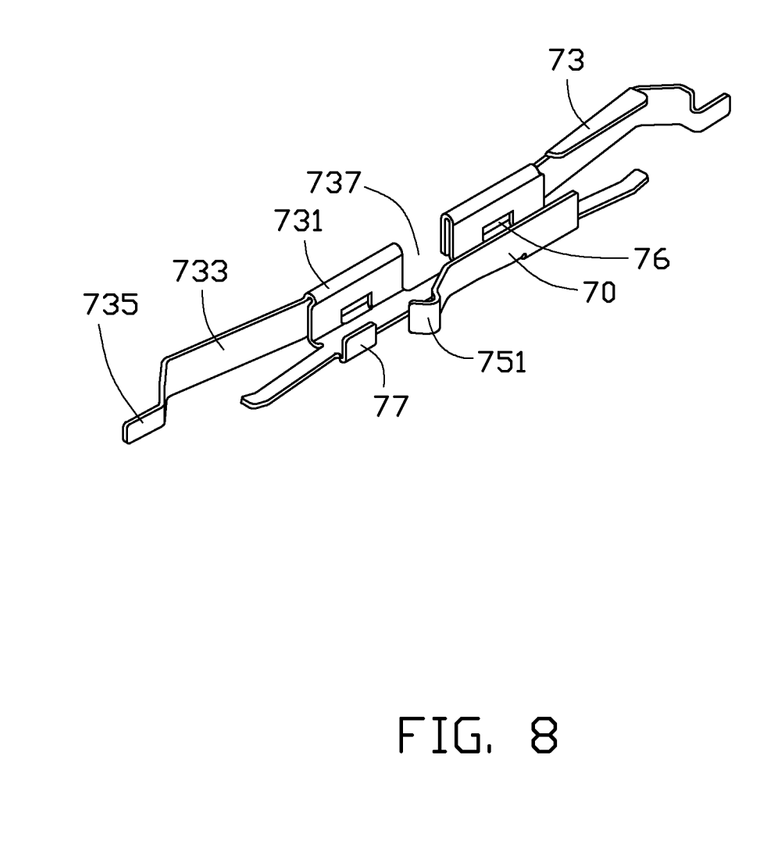
FIG. 8 is similar to FIG. 7, but shown another aspect.

Referring to FIGS. 7-8, each elastic member 70 includes a base plate 71, two elastic plates 73, a latching plate 75 and an inserting plate 77. The elastic plates 73 define an opening 737 therebetween to receive the bridge 156 of the main housing 10. Each elastic plate 73 includes a connecting portion 731, a middle portion 733 and a curved portion 735. The connecting portions 731 connecting the base plate 71 are U-shaped and each of which defines a locking hole 76 for receiving the corresponding protrusion 157 of the main housing 10. The latching plate 75 is elastic and includes a positioning portion 751. The positioning portion 751 is selectively engaged in the first notch 331 and the second notch 333 of the sliding housing 30 when the sliding housing 30 is attached to the main housing 10.

To attach the sliding housing 30 to the main housing 10, referring to FIGS. 9-13, the elastic members 70 are attached to the locking portions 15 correspondingly. The latching plate 75 is received in the first gap 152 and the elastic plates 73 are received in the second gap 153 correspondingly. The bar 155 is positioned between the latching plate 75 and the bridge 156 is engaged in the opening 737. The positioning portions 751 extend through the receiving holes 1222. The inserting plate 77 is inserted into the third gap 154, and the protrusions 157 are inserted into the locking holes 76 correspondingly, so that the elastic members 70 are firmly attached to the main housing 10.

The sliding housing 30 is then attached to the main housing 10. The guiding plates 122 of the main housing 10 are slidingly received in the space 332 between the ledges 33 and the base board 31. The positioning portions 751 resist the supporting plates 124 correspondingly. The wings 341 of the metal board 34 pass through the vertical wall 136 of the main housing 10 via the cutouts 137.

The stopping member 50 is attached to the latching portion 13. The main plate 51 is laid on the horizontal surface 131 of the latching portion 13, and the locking plate 53 of the stopping member 50 is inserted into the slot 133 of the latching portion 13. The bent plate 57 is adjacent to the vertical wall 136 and the blocks 135 extend through the latching holes 59 correspondingly. The bent plate 57 covers the cutouts 137 to stop the sliding housing 30 moving away from the main housing 10. The grooves 134 are beneath the curved ends 552 of the engaging arms 55 correspondingly for easily detaching the stopping member 50 from the main housing 10.

Figure 9:
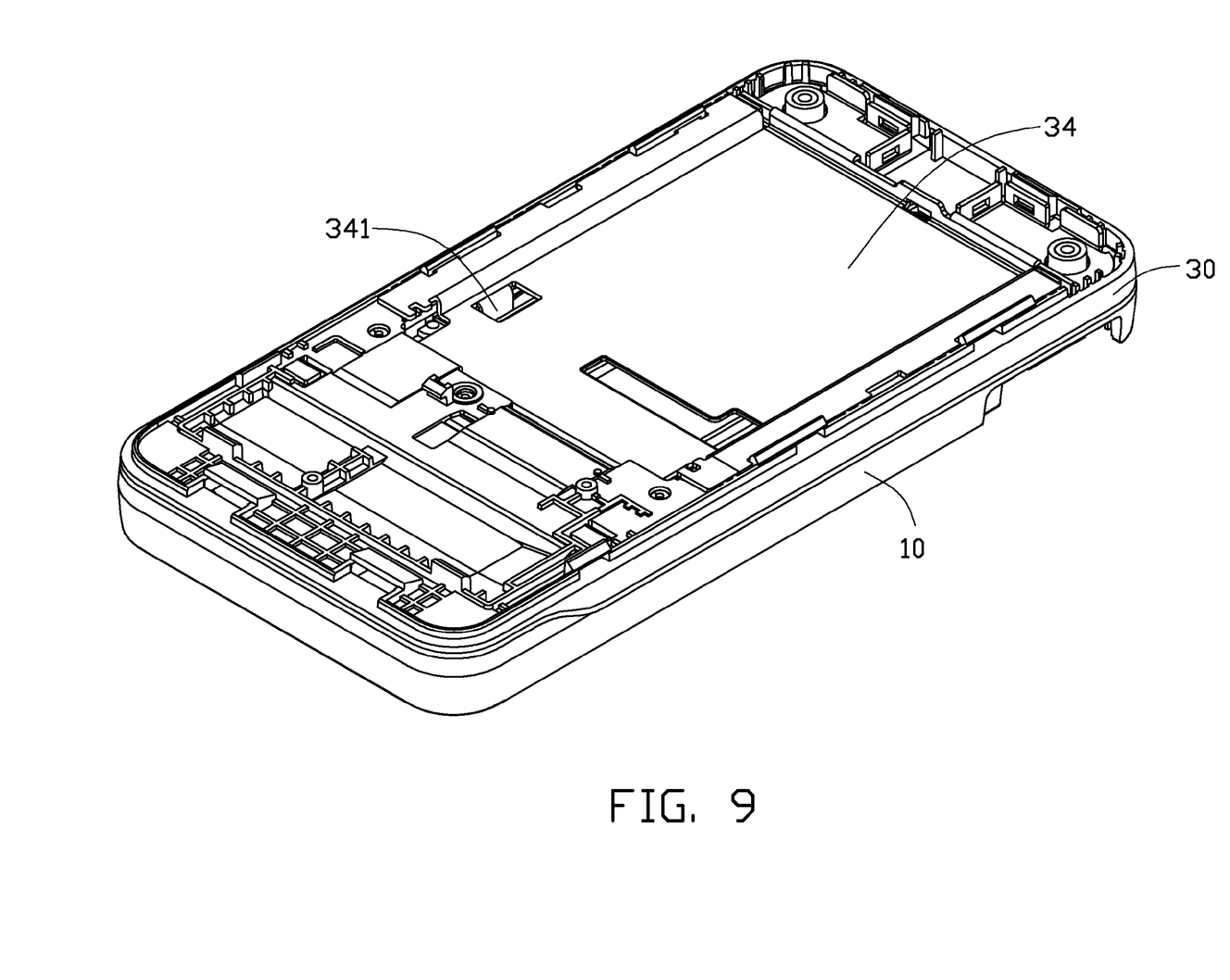
FIG. 9 is an assembled, isometric view of the sliding mechanism shown in FIG. 1, showing the sliding mechanism in a closed state.
Figure 10:
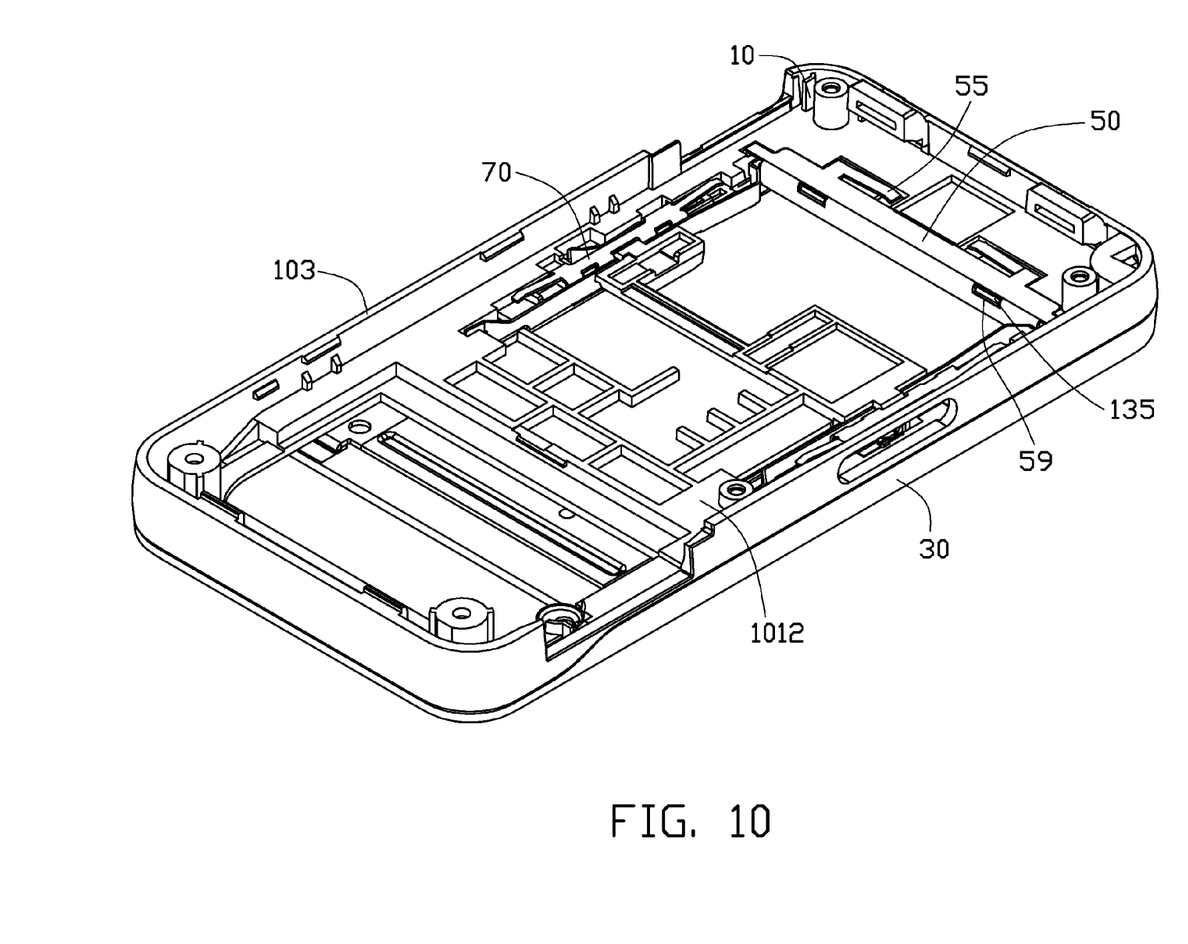
FIG. 10 is similar to FIG. 9, but shown another aspect.
Figure 11:
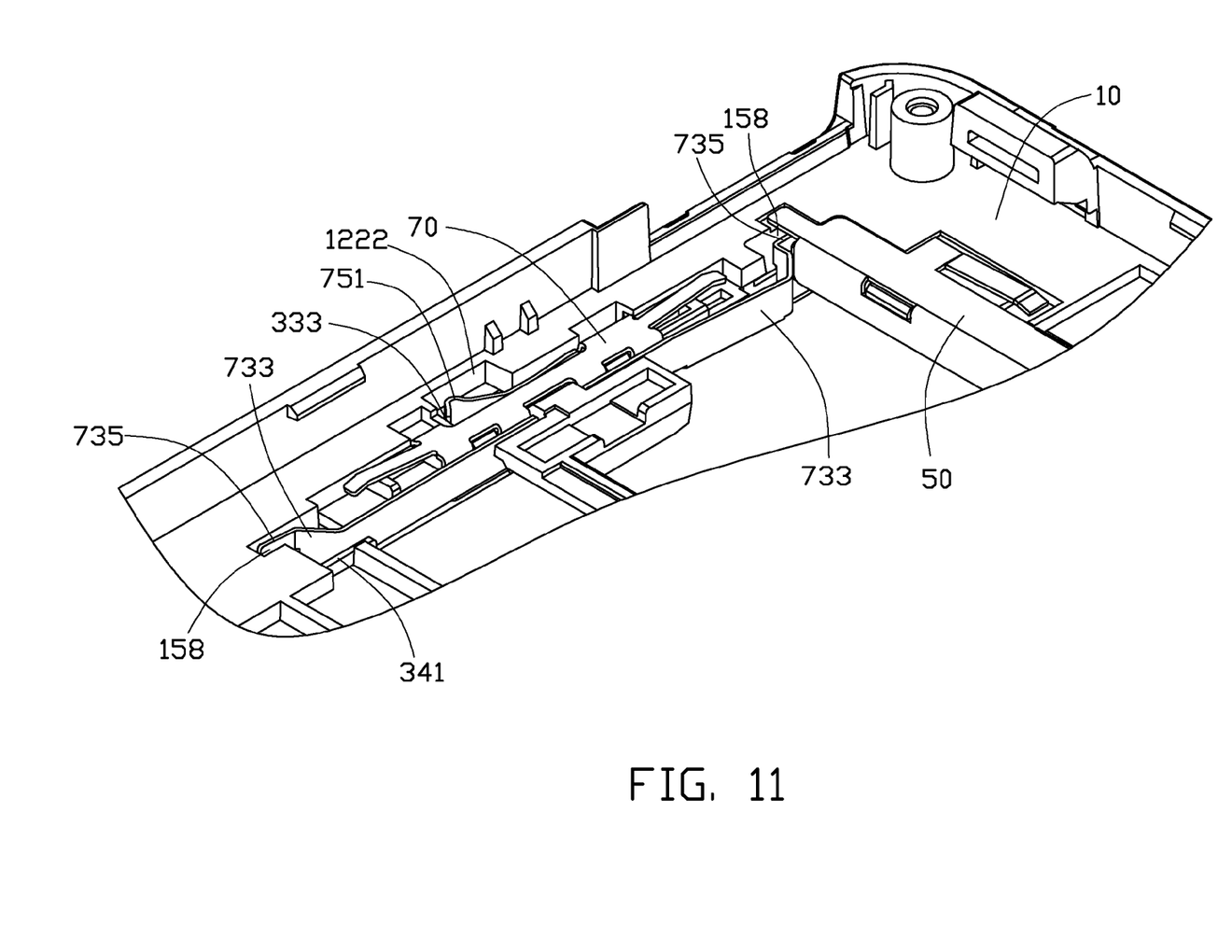
FIG. 11 is a partially, enlarged view of the assembled sliding mechanism shown in FIG. 1.

When the sliding housing 30 is moved toward the main housing 10, the guiding plates 122 slide along the ledges 33 correspondingly, and the positioning portions 751 are pressed down by the ledges 33 correspondingly. When the protrusions 157 reach the second notches 333 correspondingly, the protrusions 157 rebound to original position and are locked in the second notches 333. At this time, the sliding mechanism 100 is at a closed state.

Figure 12:
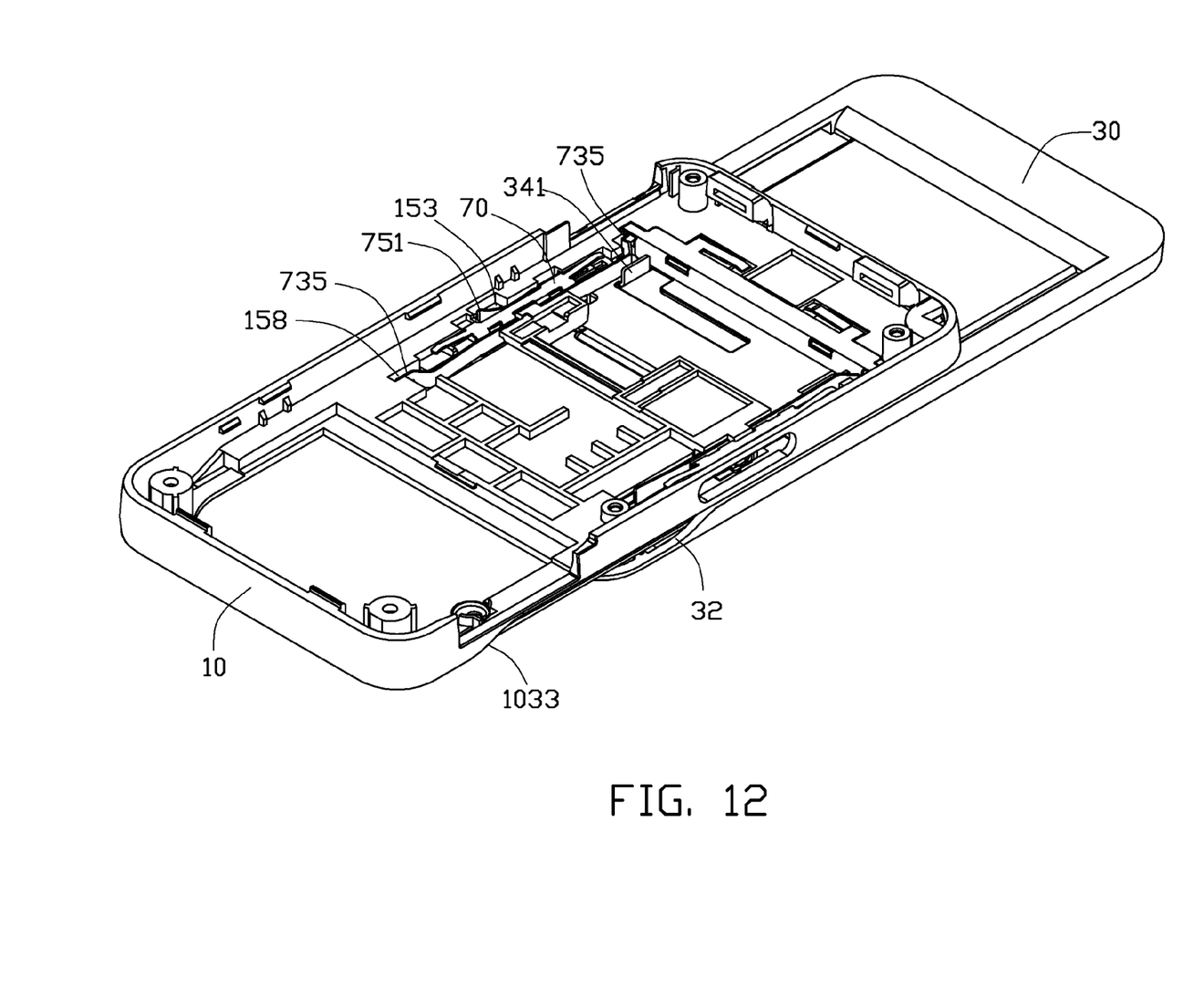
FIG. 12 is an assembled, isometric view of the sliding mechanism shown in FIG. 1, showing the sliding mechanism in an open state.
Figure 13:
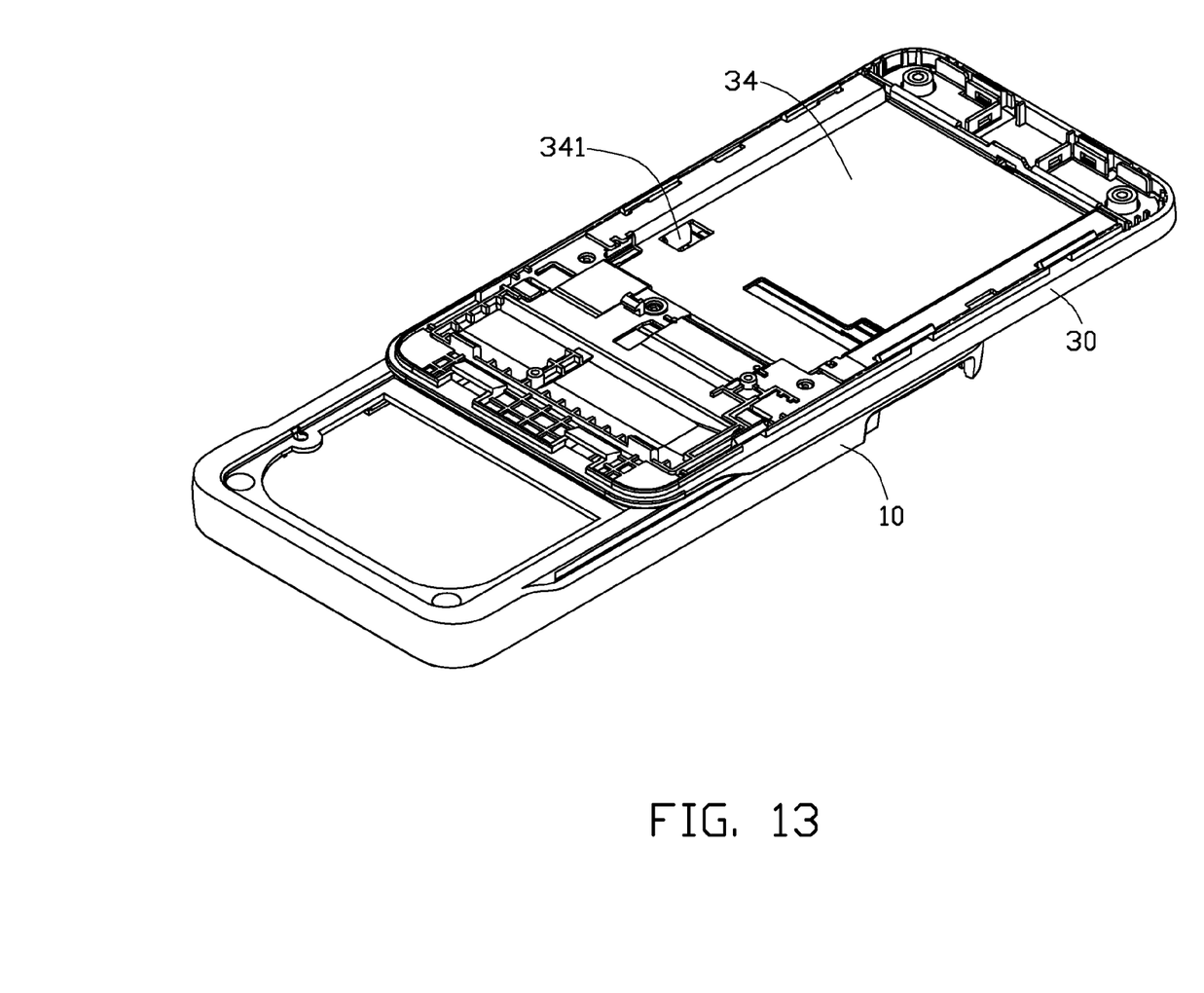
FIG. 13 is similar to FIG. 12, but shown another aspect.

When the sliding housing 30 is moved backward the main housing 10, the protrusions 157 are pushed to exit the second notches 333 and are then pressed down by the ledges 33 correspondingly. When the protrusions 157 reach the first notches 331 correspondingly, the protrusions 157 rebound to original position and are locked in the first notches 331. At this time, the sliding mechanism 100 is at an open state.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism for portable electronic device, the sliding mechanism comprising:
    a sliding housing including two ledges, each ledge defining a first notch and a second notch;
    a main housing including two rails and two elastic members; the sliding housing being slidably attached to the main housing by engagement of the ledges and the rails, each elastic member including a base plate, two symmetric elastic plates and a latching plate, the two elastic plates extending from a first edge of the base plate, the latching plate extending from the second edge of the base plate and being parallel to the elastic plates, the latching plate including a positioning portion, the positioning portion selectively engaged in the first notch or the second notch of each ledge; and
    a stopping module preventing the sliding housing from separating from the main housing.

2. The sliding mechanism as claimed in claim 1, wherein the main housing comprises two locking portions, and each elastic member is attached to a corresponding locking portion.

3. The sliding mechanism as claimed in claim 2, wherein each locking portion defines a first gap and a second gap, the latching plate is received in the first gap and the two elastic plates are received in second gap.

4. The sliding mechanism as claimed in claim 3, wherein each of the rails defines a receiving hole communicating with the corresponding first gap, and the corresponding positioning portion extends through the receiving hole to resist the corresponding ledge.

5. The sliding mechanism as claimed in claim 3, wherein each locking portion comprises a bridge, and an opening is formed between the two elastic plates for receiving the bridge.

6. The sliding mechanism as claimed in claim 5, wherein each locking portion further defines a third gap, each elastic member further comprises an inserting plate adjacent to the positioning portion, and the inserting plate is received in the third gap.

7. The sliding mechanism as claimed in claim 3, wherein each elastic member further comprises a base plate connecting the latching plate and the elastic plates, each elastic plate defines a locking hole adjacent to the base plate, and each locking portion comprises two protrusions locked in the locking holes correspondingly.

8. The sliding mechanism as claimed in claim 7, wherein each of elastic plates comprises a connecting portion connecting with the base plate, the locking hole is defined in the connecting portion.

9. The sliding mechanism as claimed in claim 8, wherein the connecting portion is U-shaped.

10. The sliding mechanism as claimed in claim 8, wherein the elastic plate of each elastic member further comprises a curved portion, the curved portions of the elastic member extend reversely each other, and the corresponding locking portion defining two receiving chamber for receiving the curved portions of the elastic member correspondingly.

11. The sliding mechanism as claimed in claim 1, wherein the stopping module comprises at least one wing on the sliding housing, a latching portion formed on the main housing and a stopping member attached to the latching portion, the latching portion defines at least one cutout allowing the at least one wing to pass through, and the stopping member covers the at least one cutout to prevent the wing from sliding out from the cutout.

12. The sliding mechanism as claimed in claim 11, wherein the latching portion comprises a vertical wall, the at least one cutout is defined in the vertical wall, the stopping member comprises a bent plate adjacent to the vertical wall and covers the at least one cutout, the bent plate defines two latching holes, and two blocks extend from the vertical wall and are locked in the latching holes correspondingly.

13. The sliding mechanism as claimed in claim 12, wherein the stopping member further comprises a locking plate and the main plate connecting the locking plate and the bent plate, and the latching portion defines a groove for receiving the locking plate.

14. The sliding mechanism as claimed in claim 13, wherein the stopping member further comprises two engaging arms, and the latching portion defines two slots beneath the engaging arms correspondingly.

15. A sliding mechanism for portable electronic device, the sliding mechanism comprising:
   a sliding housing including a guiding portion, the guiding portion defining at least one first notch and at least one second notch;
   a main housing including an engaging portion and at least one elastic member, the sliding housing being slidably attached to the main housing by engagement of the guiding portion and the engaging portion, the at least one elastic member including a positioning portion, the positioning portion being selectively engaged in the at least one first notch or the at least one second notch; and
   a stopping module preventing the sliding housing from separating from the main housing;
   wherein the main housing defines a first gap, the at least one elastic members comprises a latching plate received in the first gap, the engaging portion of the main housing defines a receiving hole communicating with the first gap, and the corresponding positioning portion extends through the receiving hole to resist the guiding portion of the sliding housing;
   wherein the at least one elastic member further comprises two elastic plates extending reversely each other, the main housing further defines a second gap for receiving the elastic plates and comprises a bridge in the second gap, and an opening is formed between the two elastic plates for allowing the bridge to extend through.

16. The sliding mechanism as claimed in claim 15, wherein the elastic plate defines a locking hole, a bar is formed between the first gap and the second gap, and two protrusions extend from the bar and are locked in the locking holes correspondingly.

17. The sliding mechanism as claimed in claim 15, wherein the stopping module comprises at least one wing on the sliding housing, a latching portion formed on the main housing and a stopping member attached to the latching portion, the latching portion defines at least one cutout allowing the at least one wing to pass through, and the stopping member covers the at least one cutout to prevent the wing from sliding out from the cutout.

* * * * *